Dec. 18, 1962  A. R. CUNNINGHAM  3,068,635
HUB AND TINE ASSEMBLY FOR TEDDER
Filed Nov. 29, 1960
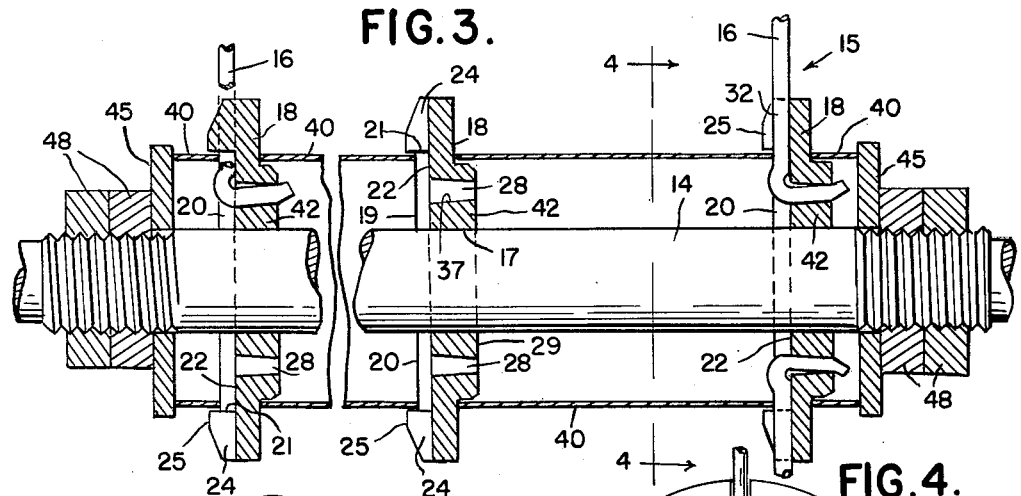
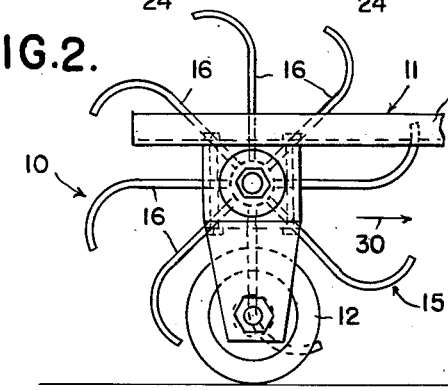
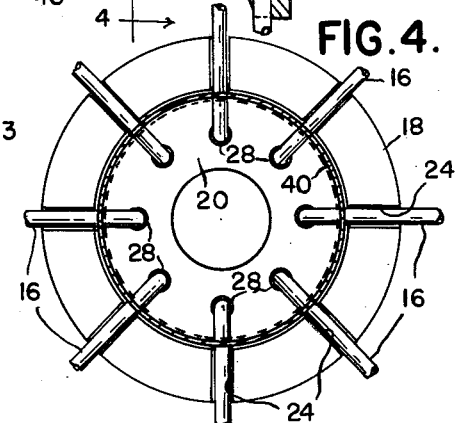
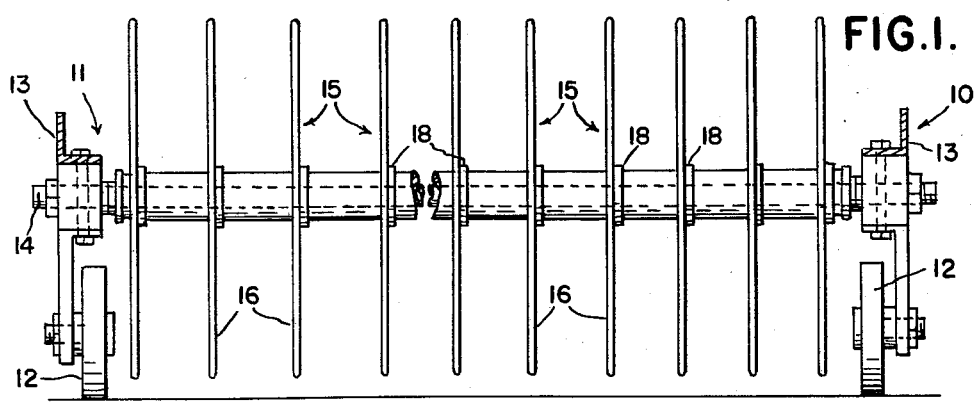
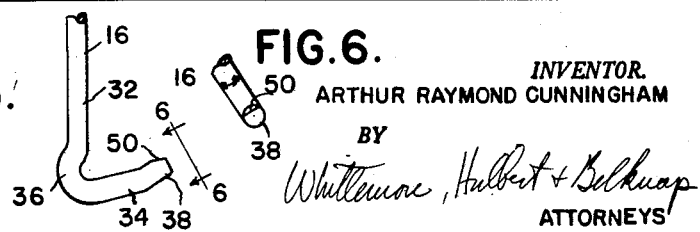
INVENTOR.
ARTHUR RAYMOND CUNNINGHAM
BY
Whittemore, Hulbert & Belknap
ATTORNEYS United States Patent Office 3,068,635
Patented Dec. 18, 1962

3,068,635
HUB AND TINE ASSEMBLY FOR TEDDER
Arthur Raymond Cunningham, Chicago, Ill., assignor to Cunningham & Sons, Chicago, Ill., a partnership
Filed Nov. 29, 1960, Ser. No. 72,434
12 Claims. (Cl. 56—372)

This invention relates generally to tedders and refers more particularly to a hub and tine assembly for tedders.

One object of the invention is to provide an improved means for mounting tines on the shaft of a tedder which will greatly facilitate servicing and replacement of parts and which will enable the manufacture of tedders at minimum cost.

Another object of the invention is to provide an improved means for mounting a plurality of radial tines on a tedder shaft including an annular member on the shaft having a plurality of circumferentially spaced radial slots therein, the inner end portions of the tines being respectively disposed in the slots and held against circumferential movement thereby, the annular member also having generally axially extending slots respectively receiving laterally offset portions on the inner ends of the tines.

Another object of the invention is to provide an improved means for supporting a plurality of radial tines on a tedder shaft in which the angle between the inner end portions of the tines and the laterally offset portions thereof is different from the angle between the radial and generally axial slots of the annular member, whereby the tines are flexed and the inner end portions thereof frictionally engage a wall of the radial slots and the offset portions thereof frictionally engage a wall of the generally axially extending slots.

Another object of the invention is to provide an improved means for mounting tines on a tedder shaft wherein the radial slots extend along one side of the annular member and are open along the said one side thereof for lateral insertion of the tines into the slots.

Another object of the invention is to provide an improved means for mounting tines on a tedder shaft wherein the generally axially extending slots project through to the opposite side of the annular member and the offset tine portions project from the generally axially extending slots and terminate beyond the said opposite side of said annular member in retaining formations engageable with the opposite side of the annular member.

Another object of the invention is to provide an improved means for mounting tines on a tedder shaft wherein the tines are arranged in a plurality of axially spaced sets with the tines of each set projecting radially outwardly from the associated annular member in circumferentially spaced relation, and with the tines of adjacent sets separated from one another by tubular spacers.

Another object of the invention is to provide an improved means for mounting tines on a tedder shaft wherein the tubular spacers locate and properly space the annular members of each tine set and also serve to retain the tines in their slots against lateral displacement.

The foregoing, as well as other objects, will become more apparent as this description proceeds, especially when considered with the accompanying drawings, wherein:

FIGURE 1 is a fragmentary elevational view, partly in section, of a tedder constructed in accordance with my invention.

FIGURE 2 is a fragmentary side elevation of the structure shown in FIGURE 1, looking toward the left.

FIGURE 3 is an enlarged fragmentary longitudinal sectional view of the tedder shaft, more clearly illustrating the manner in which the tines are mounted on the shaft.

FIGURE 4 is an enlarged sectional view taken on the line 4—4 of FIGURE 3.

FIGURE 5 is a fragmentary elevational view of the inner end portion of a tine.

FIGURE 6 is a view taken on the line 6—6 of FIGURE 5.

Referring now more particularly to the drawings, the tedder is generally indicated by the reference numeral 10 and includes a rugged draft frame 11 of angle iron construction. The draft frame is supported by wheels 12 and includes a pair of laterally spaced members 13 to which the opposite ends of the tedder shaft 14 are journaled. The shaft is freely rotatably mounted on the draft frame, and between the draft members 13 a plurality of axially spaced sets 15 of tines are provided, as seen in FIGURE 1.

Each tine set 15 includes a plurality of generally radially outwardly extending circumferentially spaced tines 16. Referring to FIGURE 3, it will be seen that each tine set also includes an annular hub member 18. A central opening 17 in each hub freely receives the shaft to be axially slidable thereon. A cylindrical recess 20 is provided along one side 19 of each hub. The annular side wall 21 of the recess is cylindrical and concentric with the central opening in the hub. The bottom surface 22 of the recess is a plane surface at right angles to the axis of the hub and therefore at right angles to the axis of the shaft in the assembled relation of the parts.

In the region radially outwardly of the recess, the hub is formed with a plurality of equally circumferentially spaced radially extending slots 24 which extend from the recess 20 to the radially outer extremity of the hub. The radial slots 24 are of uniform circular cross section open at both ends and also open along one side 25 throughout their entire length. The bottoms of the radial slots 24 lie in the plane of the bottom surface 22 of the recess.

Each hub is also formed with a plurality of generally axially extending slots 28, equal in number to the radial slots 24. The axial slots 28 extend from the bottom of the recess 20 entirely through to the other side 29 of the hub, and the axial slots 28 are located directly radially inwardly from the radial slots 24. In other words, the axis of each axial slot 28 lies in a radial plane which contains the axis of the hub and which also contains the axis of a radial slot 24.

The tines 16 are resiliently flexible and may be formed of spring steel. Preferably, the tines are circular in cross section and of a diameter to be closely received in slots 24. At their outer ends, the tines are curved in an approximately quarter-circular outline in the direction opposite that toward which the tines rotate in passing beneath the shaft 14. Referring to FIGURE 2, the tedder will move in the direction of the arrow 30 and the tines will rotate clockwise by reason of field traction, that is, by engagement with the cut crop and the stubble on the ground. The curve on the ends of the tines is such that the crop will be elevated gently and tossed or ruffled and then redeposited on the stubble in a loose overturned and agitated condition for drying.

The inner end portions of the tine shanks are generally indicated at 32 and will be seen to be straight and when mounted on the annular members in the radial slots thereof to extend generally radially. The inner end portions 32 of the tines terminate in the laterally offset portions 34 which extend at an acute angle to the straight inner end portions 32 of the tine shanks and are connected thereto by an arcuate integral portion 36.

Referring again to FIGURE 3, it will be noted that the axial slots 28 are preferably frusto-conical in shape, that is, they are of uniformly decreasing circular cross section from the recess 20 to the opposite side 29 of the hub 18. The axis of each axial slot 28 forms a right angle with the axis of the corresponding radial slot 24, and the radially inner wall 37 of each axial slot forms an acute angle with the axis of its corresponding radial slot 24 which is slightly larger than the acute angle formed between the inner end portion 32 of the tine and the laterally offset terminal portion 34 thereof, in the free state of the tine. (See FIGURES 3 and 5, FIGURE 3 showing portions of the tines assembled and flexed, and FIGURE 5 showing a portion of a tine in its free state.)

With further reference to the tine configuration, it will be noted that the free end extremity of the laterally offset portion 34 of each tine has a retaining formation 38 which is simply an extension of the offset portion 34 but bent at a slight angle thereto toward the shank of the tine. Hence, the axis of the inner end portion 32 and of the laterally offset portion 34 as well as that of the retaining formation 38 lie in a common plane at right angles to the plane of the curved outer end of the tine.

Referring again to FIGURE 3, it will be noted that the hubs of the respective tine sets are separated by the tubular spacers 40. One end of each tubular spacer extends into the recess 20 of a hub to be supported thereby, being only slightly smaller in diameter than the recess. The other end of the hub member is supported on a concentric annular boss 42 of the hub which projects from the side 29 thereof and which is of only slightly smaller diameter than the spacer. The hubs are capable of axial movement on the shaft, but are located in properly spaced position by the spacers 40. It will further be noted that one end of each spacer, that is, the end that extends into the hub recess 20, engages the inner end portion 32 of the tine shanks to clamp them in assembled position on the hub and thereby prevents them from being laterally withdrawn.

Annular retainers 45 are provided on either end of the shaft to retain the axially spaced tine sets. The retainers are freely axially slidable on the threaded portions of the shaft, and are clamped up tight against the ends of the end spacers by nuts 48. Hence, the entire assembly is clamped together and it will be noted that none of the hubs are rigidly secured to the shaft. They will nevertheless be normally held against rotation by friction due to the engagement thereof with the spacers which in turn engage the retainers 45 held by the clamps. The axial clamping pressure is usually enough to retain the hubs from rotation.

In order to assemble a set of tines with a hub 18, each tine is disposed generally radially with respect to a hub, at the side 19 thereof, with its laterally offset portion 34 pointing toward the hub. Then the tine is moved bodily toward the hub, causing the offset portion 34 to enter an axial slot 28 and the inner shank portion 32 to engage in the corresponding radial slot 24. Referring to FIGURE 3, an upper tine will normally be tilted somewhat with its upper end to the right. This will enable the laterally offset portion 34 to fit more readily in the axial slot 28. The frusto-conical shape of the axial slot 28 provides relief to clear the retaining formation 38. It will be noted that the retaining formation 38 is beveled or relieved on one side at 50 to further provide clearance and also to prevent scoring the axial passage. As the tine is continued in its lateral movement towards fully assembled position, the laterally offset portion 34 will flex away from the shank portion 32 of the tine, and the retaining formation 38 will then snap through and beyond the axial slot 28 to releasably lock behind the boss 42 of the hub. It will be noted that the offset portion 34 is flexed somewhat in assembled position, forming a somewhat larger angle with the shank than in its natural condition shown in FIGURE 5. Thus, the shank portion 32 of the tine is frictionally pressed against the radial slot 24 in full surface engagement, and the offset portion 34 is frictionally pressed against the radially inner wall 37 of the axial slot 28 in full surface engagement. Together with this frictional pressure engagement of the shank and offset portions of the tines, the laterally offset retaining formation 38 also assists in releasably holding the tines in assembly. Of course, the spacers 40 provide a further protection against the tines becoming accidentally laterally withdrawn from the slots of the hubs.

What I claim as my invention is:

1. In tedding apparatus of the type having a frame, a shaft mounted on said frame, and a plurality of tedder tines carried by said shaft and projecting generally radially outwardly therefrom in circumferentially spaced relation for rotation about the axis thereof, the improvement comprising means for supporting said tines on said shaft including a hub on said shaft having circumferentially spaced generally radial slots therein, said tines having radially inner end portions respectively disposed in said generally radial slots and held against circumferential movement thereby, said hub also having generally axially extending slots therein, and laterally offset portions on the inner ends of said tines respectively received in said generally axially extending slots.

2. In tedding apparatus of the type having a frame, a shaft mounted on said frame, and a plurality of tedder tines carried by said shaft and projecting generally radially outwardly therefrom in circumferentially spaced relation for rotation about the axis thereof, the improvement comprising means for supporting said tines on said shaft including a hub on said shaft having circumferentially spaced generally radial slots therein, said tines having radially inner end portions respectively disposed in said generally radial slots and held against circumferential movement thereby, said hub also having generally axially extending slots therein, laterally offset portions on the inner ends of said tines respectively received in said generally axially extending slots, and cooperating engaging means on said hub and tines for opposing withdrawal of said offset tine portions from said generally axially extending slots.

3. The structure defined in claim 1 wherein said generally axially extending slots project through one side of said hub, said offset tine portions project from said generally axially extending slots and terminate beyond said one side of said hub in retaining formations engageable with said one side of said hub to oppose withdrawal of said offset tine portions from said generally axially extending slots.

4. The structure defined in claim 1 wherein said tines are resiliently flexible, and wherein the angle between said generally radial slots and said generally axially extending slots is different from the angle between said inner end portions of said tines and the laterally offset portions thereof, whereby said tines are flexed and the inner end portions thereof frictionally engage a wall of said generally radial slots and said offset portions thereof frictionally engage a wall of said generally axially extending slots.

5. In tedding apparatus of the type having a frame, a shaft mounted on said frame and a plurality of tedder tines carried by said shaft and projecting generally radially outwardly therefrom in circumferentially spaced relation for rotation about the axis thereof, the improvement comprising means for supporting said tines on said shaft including a hub on said shaft having circumferentially spaced generally radial slots along one side thereof and open along said one side, said tines having radially inner end portions laterally insertable into and respectively disposed in said generally radial slots and held against circumferential movement thereby, said hub also having generally axially extending slots therein, and laterally offset portions on the inner ends of said tines respectively received in said generally axially extending slots.

6. The structure defined in claim 5 wherein said tines are resiliently flexible, and wherein the angle between said generally radial slots and said generally axially extending slots is different from the angle between said inner end portions of said tines and the laterally offset portions thereof, whereby said tines are flexed and the inner end portions thereof frictionally engage a wall of said generally radial slots and said offset portions thereof frictionally engage a wall of said generally axially extending slots.

7. The structure defined in claim 6 wherein said generally axially extending slots project through the side of said hub member opposite the said one side thereof, said offset tine portions project from said generally axially extending slots and terminate beyond said opposite side of said hub member in retaining formations engageable with said opposite side of said hub member, said retaining formations are laterally displaced with respect to the remainder of said offset portions, and the wall of each generally axially extending slot opposite the wall thereof frictionally engaged by said offset tine portions is relieved adjacent said generally radial slots to permit sufficient flexing of said offset tine portions during insertion thereof to clear said retaining formations.

8. In tedding apparatus of the type having a frame, a shaft mounted on said frame and a plurality of tedder tines carried by said shaft and projecting generally radially outwardly therefrom in circumferentially spaced relation for rotation about the axis thereof, the improvement comprising means for supporting said tines on said shaft including a plurality of axially spaced hubs on said shaft each having circumferentially spaced generally radial slots along one side thereof and open along said one side, said tines being arranged in axially spaced sets respectively mounted on said hubs, said tines of each set having radially inner end portions laterally insertable into and respectively disposed in the generally radial slots of each hub and held against circumferential movement thereby, said hubs also having generally axially extending slots therein, laterally offset portions on the inner ends of said tines respectively received in said generally axially extending slots, and tubular spacers between said hubs, said spacers being concentric with and surrounding said shaft and the ends thereof adjacent the aforesaid sides of said hubs retaining said tines in said generally radial slots against lateral displacement therefrom.

9. The structure defined in claim 8 wherein said tines are resiliently flexible, and wherein the angle between said generally radial slots and said generally axially extending slots is different from the angle between said inner end portions of said tines and the laterally offset portions thereof, whereby said tines are flexed and the inner end portions thereof frictionally engage a wall of said generally radial slots and said offset portions thereof frictionally engage a wall of said generally axially extending slots.

10. The structure defined in claim 9 wherein said generally axially extending slots project through the side of each hub opposite the said one side thereof, said offset tine portions project from said generally axially extending slots and terminate beyond said opposite side of each hub in retaining formations engageable with said opposite side of each hub, said retaining formations are laterally displaced with respect to the remainder of said offset portions, and the wall of each generally axially extending slot opposite the wall thereof frictionally engaged by said offset tine portions is relieved adjacent said generally radial slots to permit sufficient flexing of said offset tine portions during insertion thereof to clear said retaining formations.

11. In tedding apparatus of the type having a frame, a shaft mounted on said frame and a plurality of tedder tines carried by said shaft and projecting generally radially outwardly therefrom in circumferentially spaced relation for rotation about the axis thereof, the improvement comprising means for supporting said tines on said shaft including a hub on said shaft having circumferentially spaced generally radial slots therein, said tines having radially inner end portions respectively disposed in said generally radial slots and held against circumferential movement thereby, said hub also having slots therein respectively transverse to said generally radial slots, laterally offset portions on the inner ends of said tines respectively received in said transverse slots, said tines being resiliently flexible, the angle between said generally radial slots and said transverse slots being different from the angle between said inner end portions of said tines and the laterally offset portions thereof, whereby said tines are flexed and the inner end portions thereof frictionally engage a wall of said generally radial slots and said offset portions thereof frictionally engage a wall of said transverse slots.

12. In tedding apparatus of the type having a frame, a shaft mounted on said frame, and a plurality of tedder tines carried by said shaft and projecting generally radially outwardly therefrom in circumferentially spaced relation for rotation about the axis thereof, the improvement comprising means for supporting said tines on said shaft including a hub on said shaft having circumferentially spaced generally radial slots therein, said tines having radially inner end portions respectively disposed in said generally radial slots and held against circumferential movement thereby, said hubs also having slots therein respectively transverse to said generally radial slots, and laterally offset portions on the inner ends of said tines respectively received in said transverse slots.

References Cited in the file of this patent

UNITED STATES PATENTS

| | | |
|---|---|---|
| 467,224 | Earnest | Jan. 19, 1892 |
| 789,670 | Rarig | May 9, 1905 |
| 2,559,862 | Ferguson | July 10, 1951 |
| 2,932,148 | van der Lely et al. | Apr. 12, 1960 |